United States Patent [19]

Fontaine et al.

[11] Patent Number: 4,546,808
[45] Date of Patent: Oct. 15, 1985

[54] PNEUMATIC TIRE

[75] Inventors: Jean F. L. Fontaine, Bürden; Maurice Graas, Luxembourg, both of Luxembourg

[73] Assignee: The Goodyear Tire & Rubber Company, Akron, Ohio

[21] Appl. No.: 568,971

[22] Filed: Jan. 6, 1984

[51] Int. Cl.$^4$ ............................................. B60C 11/06
[52] U.S. Cl. .............................. 152/209 R; D12/141; D12/142
[58] Field of Search .......... 152/209 R, 209 A, 209 B, 152/209 NT, 209 WT, 209 D; D12/141–145, 146–149

[56] References Cited

U.S. PATENT DOCUMENTS

| D. 236,888 | 9/1975 | Verdier | D12/147 |
| 3,155,135 | 11/1964 | Klenk | 152/209 R |
| 3,162,229 | 12/1964 | Ellenrieder et al. | 152/209 R |
| 3,286,756 | 11/1966 | Ellenrieder et al. | 152/209 A |
| 3,405,753 | 10/1968 | Verdier | 152/209 A |
| 3,705,613 | 12/1972 | Verdier | 152/209 R |
| 3,897,813 | 8/1975 | Verdier | 152/209 R |

Primary Examiner—Lois E. Boland
Attorney, Agent, or Firm—L. R. Drayer

[57] ABSTRACT

A pneumatic tire having a tread with a mid-circumferential plane and a plurality of circumferential grooves therein of two different configurations. The grooves of each configuration have differing widths and are interspersed together so that the total area of grooves on each side of said plane are equal.

8 Claims, 3 Drawing Figures

PNEUMATIC TIRE

BACKGROUND OF INVENTION

This invention relates to pneumatic tires and in particular but not exclusively to tires for automobiles.

It is known that tires operate in conditions in which the inside and outside of the tire are subject to different operating conditions, for example during cornering. The terms inside and outside of a tire refer to the positions as on a vehicle e.g. the outside of the tire is that side of the tire facing outwardly of the vehicle.

It is known therefore to have different tread patterns on the inside and outside portions of the tire tread in order to compensate for these differences, for example, in U.S. Pat. No. 3 155 135 there is shown a tire with a tread portion having circumferential ribs on the outer side portion of the tread pattern and a block pattern on the inside portion of the tread pattern.

It is also known to have tread patterns formed by the repetition of an elementary shape to give an asymmetrical total tread pattern.

A disadvantage of some asymmetrical tread patterns is that the ratio of the groove area to the area of the interposed surfaces differs between the inside and outside portions of the tire.

In accordance with the invention there is provided a pneumatic tire comprising a tread having a pair of lateral edges, and a mid-circumferential plane, said mid-circumferential plane dividing the tread so that one side of said plane is the inside portion of the tread and the other side of said plane is the outside portion of the tread, said tread having a plurality of circumferential grooves therein spaced axially apart across the tread and each of which has one of two differing configurations, a groove having the first of said two configurations being located on one side of the plane and having a greater width than a second groove of the first configuration, and a groove having the second of said two configurations and being located on the other side of the plane and having a greater width than a second groove of the second configuration, wherein the ratio of groove area to tread area on the inside and outside portions of the tread is substantially equal.

By having one wider groove located on each side of the plane it is possible to equalize the total areas of grooves on each side of the mid-circumferential plane of the tire.

Preferably the second groove of the first configuration is located on said other side of the plane, and the second groove of the second configuration is located on said one side of the plane.

Preferably the circumferential grooves are in the forms of straight grooves and zig-zag grooves. In a tire having an asymmetrical tread the mid-circumferential plane divides the tire so that the tread on one side of the plane can be referred to as an inside portion of the tread, and the other side of the plane as an outside portion of the tire, and preferably the wider straight groove is located in the inside portion of the tread and the wider zig-zag groove is located in the outside portion of the tread.

DESCRIPTION OF DRAWINGS

The invention will be described by way of example and with reference to the accompanying drawing in which.

DETAILED DESCRIPTION OF THE INVENTION

Figure 1:
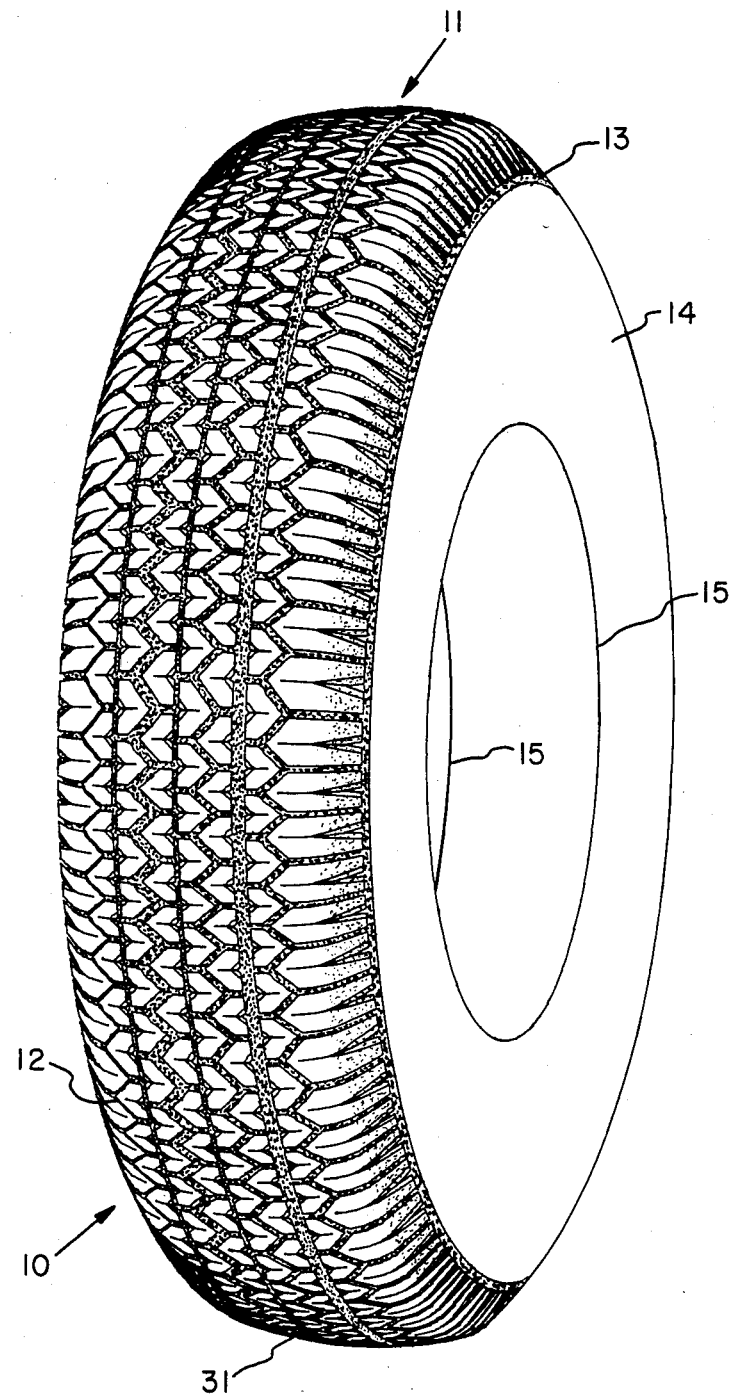
FIG. 1 is a perspective view of a tire according to this invention.
Figure 2:
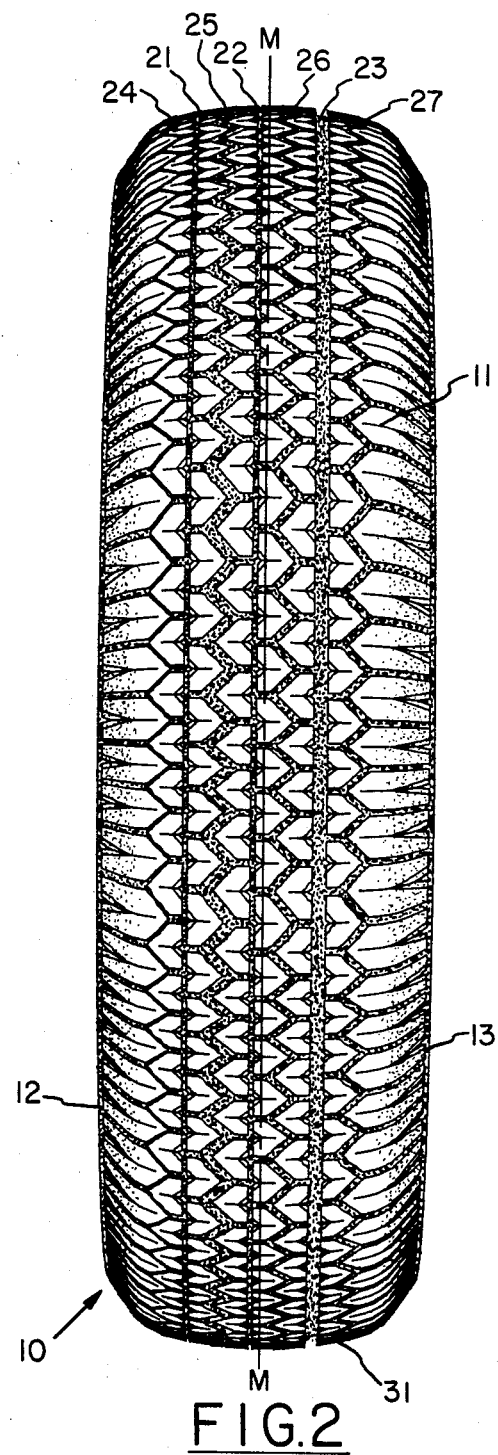
FIG. 2 is a front elevation of the tire illustrated in FIG. 1.
Figure 3:
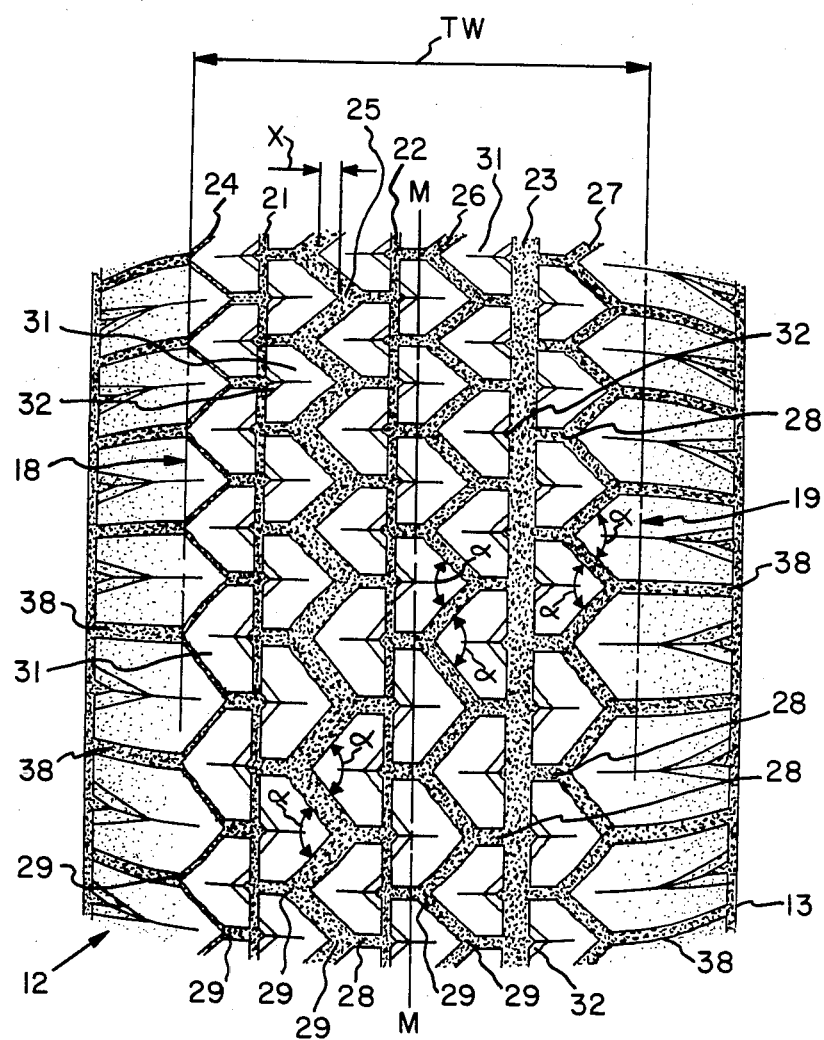
FIG. 3 is an enlarged fragmentary view of the tread portion of the tire of FIG. 1.

With reference to FIGS. 1, 2 and 3 there is illustrated an automobile pneumatic tire 10, preferably of the radial carcass type, having a ground contacting tread 11. The tread 11 is flanked by a pair of shoulders 12 and 13, through which it is joined to a pair of sidewalls 14 that extend radially inwards from the tread and each terminate in a bead 15.

The tire 10 has a mid-circumferential plane M—M and the tread has grooves 21, 22, 23, 24, 25, 26, 27 and 28 therein that divide the tread into interposed lands 31 to form a tread pattern which is arranged asymmetrically with regard to the mid-circumferential plane M—M.

The tread 11 has a tread width TW with a pair of lateral edges 18 and 19. For the purposes of this invention the tread width TW is defined as the axial distance across the tire measured from the footprint of the tire when inflated to a design pressure at a rated load. The tread includes three circumferential straight grooves 21, 22 and 23 spaced axially apart across the surface of the tread, and four circumferential zig-zag grooves 24, 25, 26 and 27. The zig-zag grooves 24, 25, 26, and 27 have included angles $\alpha$, between adjacent legs of the zig-zag, preferably of between 90° and 100° depending upon the pitch variation as is practised in the industry for tire noise reduction. The included angles $\alpha$ of the zig-zag grooves can have other values but it is desirable that there is some axial overlap X between the lands 31 on either side of the grooves, for example the lands 31 on either side of groove 25 overlap by a distance X.

The zig-zag grooves 24, 25, 26, and 27 are interspersed with the straight grooves 21, 22 and 23 and are arranged with a zig-zag groove 24 and 27 respectively adjacent each tread edge 18 and 19, and an alternating sequence of zig-zag and straight grooves across the tread from one edge 18 or 19 to the other edge 18 or 19, respectively. There are a plurality of straight axial grooves 28 and 38 (only some of which have been given reference numerals) that extend one from each peak 29 of the zig-zag grooves 24-27, so that the axial grooves 28 interconnect adjacent zig-zag and straight grooves whereas other axial straight grooves 38 are largely outside the treadwidth TW and serve as drainage channels for the grooves 24 and 27 into the shoulders 12 and 13. Whilst for the purposes of this embodiment there is an axial groove 28 extending from each peak 29 of the zig-zag grooves, it is envisaged that other designs need not have a groove 28 per peak 29 but could, for example, have a groove 28 for every other peak 29 on a zig-zag rib.

The tire 10 is mounted on a vehicle so that the shoulder 12 is on the outside of the tire, that is the side facing outwardly of the vehicle, and the shoulder 13 is on the inside of the tire, that is facing inwardly of the vehicle. Hence that side of the tread to the outside of the plane M—M will be called the outside portion of the tread and the side of the tread inside the plane M—M will be called the inside portion of the tread. The straight circumferential grooves 21, 22 are both of the same width and are narrower than the third. The grooves 21 to 23 are arranged so that the narrower grooves 21 and 22 are located in the outside portion of the tread, and the wider groove 23 is located in the inside portion of the tread. The zig-zag circumferential groove 24 is the narrowest zig-zag groove and is located adjacent the outside edge 12. The zig-zag groove 25 is the widest zig-zag groove and is located in the outside portion of the tread 11 between the two straight grooves 21 and 22. The zig-zag grooves 26 and 27 both have the same width which is intermediate the widths of the zig-zag grooves 24 and 25 and are located in the inside portion of the tread, either side of the groove 23.

The widths of the narrow straight grooves 21 and 22 are approximately 2% of tread width TW, the wider straight groove 23 has a width approximately 5-6% of tread width TW. The narrowest zig-zag groove 24 has a width approximately 1% of tread width TW, the medium width zig-zag grooves 26 and 27 have widths approximately 2-3% of tread width TW, and the widest zig-zag groove 25 has a width approximately 5% of tread width TW. The axial grooves 28 preferably all have substantially the same widths which are approximately 2-3% of tread width TW. All the groove widths are measured perpendicular to the direction of the groove at the point of measurement.

The grooves 21, 22, 23, 24, 25, 26, 27, and 28 are arranged on the tread 11 so that the total area of grooves to the total area of interposed lands 31 is substantially equal on each side of the mid-circumferential plane M—M. The total areas of the grooves to the tread area on the inside and outside portions of the tread, should not vary from each other by more than 5%. In this particular embodiment of the invention the total areas of the grooves on the inside and outside portions of the tread area are equal to 32 ±1% of the tread area in those portions. The total groove area need not necessarily be 32% of the tread area as for the present example, but could vary between nominal values of 23% and up to 40% while still maintaining the requirement that the total groove areas on each side of the M—M are substantially equal.

In this particular example the widest zig-zag groove 25 has the same area as the widest straight grooves 23. The two zig-zag groove 26 and 27 have the same area as the straight grooves 21 and 22, and the narrowest zig-zag groove 24 has an area equivalent to the total areas of those portions of the axial grooves 38 that lie within the tread width TW adjacent the zig-zag groove 27. The straight grooves 21, 22, and 23 all include notches 32 arranged in the sides of each groove. The notches 32 are each located opposite to an axial groove 28. The notches 32 are included to increase the area of the straight grooves 21-23 without increasing their widths.

It is also possible to balance the groove area on either side of the mid-circumferential plane M—M by having axial grooves 28 of differing widths.

The arrangement of the widest straight groove 23 and two medium zig-zag grooves 26 and 27 on the inside portion of the tread 11 helps to provide increased aquaplaning performance, and the arrangement of the widest zig-zag groove 25 and closed shoulder 12 being on the outside portion of the tread 11 is provided for handling and cornering performance. A further advantage is that the different groove width and asymmetrical arrangement of the grooves will help reduce tire noise.

While certain representative embodiments and details have been shown for the purposes of illustrating the invention it will be apparent to those skilled in the art that various changes and modifications could be made therein without departing from the scope of the invention, for example, the quantity of the circumferential grooves could be altered, and the shape of the circumferential grooves could be modified so that the zig-zag grooves could be made in a sinusoidal form. Furthermore it is envisaged that in some circumstances all the circumferential grooves of one particular configuration could be arranged on one side of the mid-circumferential plane M—M and all the circumferential grooves of second configuration could be arranged on the other side of the mid-circumferential plane M—M.

We claim:

1. A pneumatic tire having a ground-engaging tread portion comprising: a pair of lateral edges, a mid-circumferential centerplane dividing the ground-engaging tread portion into an inside portion and an outside portion adjacent each other, said inside portion and said outside portion extending circumferentially about the tire, a plurality of circumferentially extending grooves spaced axially apart across the ground-engaging tread portion, said plurality of grooves comprising a first and a second groove of a first configuration, a first and a second groove of a second configuration, said first groove of said first configuration having a width greater than the width of the second groove of said first configuration, said first groove of said second configuration having a width greater than the width of the second groove of said second configuration, said first groove of said first configuration being disposed on one side of said mid-circumferential centerplane and said first groove of said second configuration being disposed on the other side of said mid-circumferential centerplane, the second groove of said first configuration being disposed on said other side of said mid-circumferential centerplane and the second groove of said second configuration being disposed on said one side of said mid-circumferential centerplane, so that the ratio of groove to tread on the inside and outside portions is substantially equal.

2. A tire as claimed in claim 1 wherein said first configuration and said second configuration respectively comprises straight grooves and zig-zag grooves.

3. A tire as claimed in Claim 3, wherein the wider straight groove is located in the inside portion of the tread, and the wider zig-zag groove is located in the outside portion of the tread.

4. A tire as claimed in claim 3 wherein the straight and zig-zag circumferential grooves are arranged in sequence alternately across the tread portion from one edge to the other.

5. A tire as claimed in claim 4 wherein the tread portion comprises four zig-zag circumferential grooves and three straight circumferential grooves, there being a zig-zag groove located adjacent each of the lateral edges.

6. A tire as claimed in anyone of claim 2-5 wherein the straight groove furthest from the outside edge of the tread is said wider straight groove on the inside portion of the tread, and said wider zig-zag groove in the outside portion of the tread is the zig-zag groove in said outside portion nearest to the mid-circumferential plane.

7. A tire as claimed in claim 1 wherein the tread portion also has a plurality of axial grooves therein which interconnect with a respective peak of a zig-zag groove.

8. A tire as claimed in anyone of Claims 1, 2-5 or 7, wherein the total area of the grooves on said one side of the tread and on said other side of the tread are each substantially equal to 32% of the tread area on each respective side.

* * * * *

UNITED STATES PATENT OFFICE
CERTIFICATE OF CORRECTION

PATENT NO. : 4,546,808
DATED : October 15, 1985
INVENTOR(S) : Jean F. L. Fontaine and Maurice Graas It is certified that error appears in the above-identified patent and that said Letters Patent are hereby corrected as shown below:

In column 1 at line 67 "35" should be deleted.

Column 3 at line 39 should be: --the total groove areas on each side of the mid-circumferential plane M-M are--.

In column 3 at line 43 "groove" should be --grooves--.

In column 3, at line 62 "width" should be --widths--.

In the first line of Claim 3 "Claim 3" should be --Claim 2--.

Signed and Sealed this

Eighteenth Day of February 1986

[SEAL]

Attest:

DONALD J. QUIGG

Attesting Officer

Commissioner of Patents and Trademarks